329
United States Patent [19]

Niemeyer

[11] 3,970,337

[45] July 20, 1976

[54] CONDUIT COUPLING STRUCTURE

[75] Inventor: Robert W. Niemeyer, Avon Lake, Ohio

[73] Assignee: Alco Standard Corporation, Valley Forge, Pa.

[22] Filed: Feb. 18, 1975

[21] Appl. No.: 550,474

[52] U.S. Cl............................. 285/342; 285/382.7
[51] Int. Cl.² ...................................... F16L 19/08
[58] Field of Search................ 285/382.7, 341, 342, 285/343, 12

[56] References Cited
UNITED STATES PATENTS

| | | | |
|---|---|---|---|
| 2,316,711 | 4/1943 | Parker et al. .................. | 285/382.7 X |
| 2,727,763 | 12/1955 | Ziep ............................... | 285/382.7 X |
| 2,857,176 | 10/1958 | McTaggart et al. .......... | 285/382.7 X |
| 3,201,153 | 8/1965 | Currie............................ | 285/382.7 X |
| 3,830,532 | 8/1974 | Roberts.......................... | 285/341 |

*Primary Examiner*—Dave W. Arola
*Attorney, Agent, or Firm*—Meyer, Tilberry & Body

[57] ABSTRACT

An improvement is disclosed in a tube coupling device including first and second threadedly engageable coupling members and an annular sleeve received on the tube and having an end engageable with one of the members and contractible about the tube upon assembly of the coupling members. The improvement is defined by providing the sleeve with a second end having a diameter and a length such that the threaded coupling members cannot be interengaged when the sleeve is reversely oriented on the tube.

7 Claims, 4 Drawing Figures

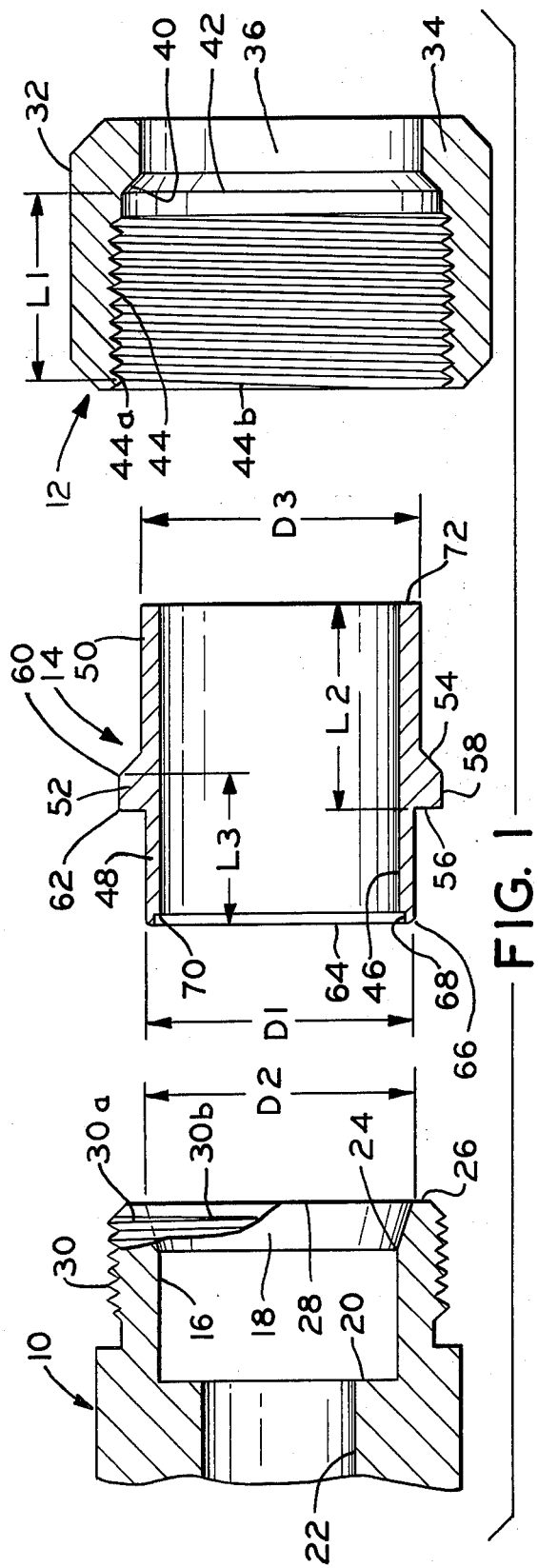
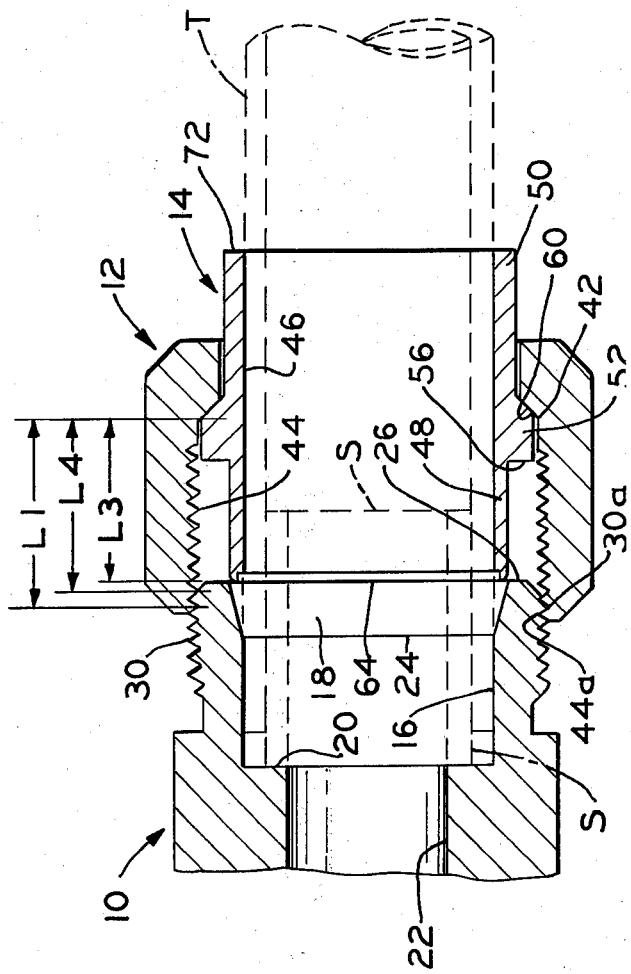
FIG. 1
FIG. 2

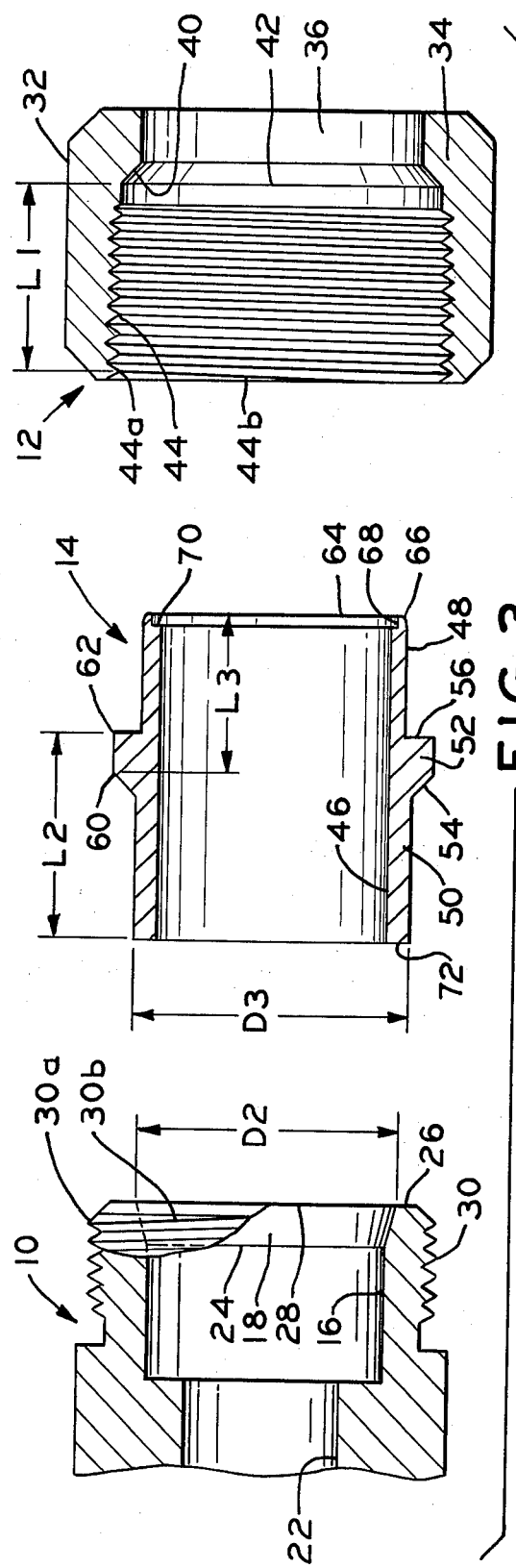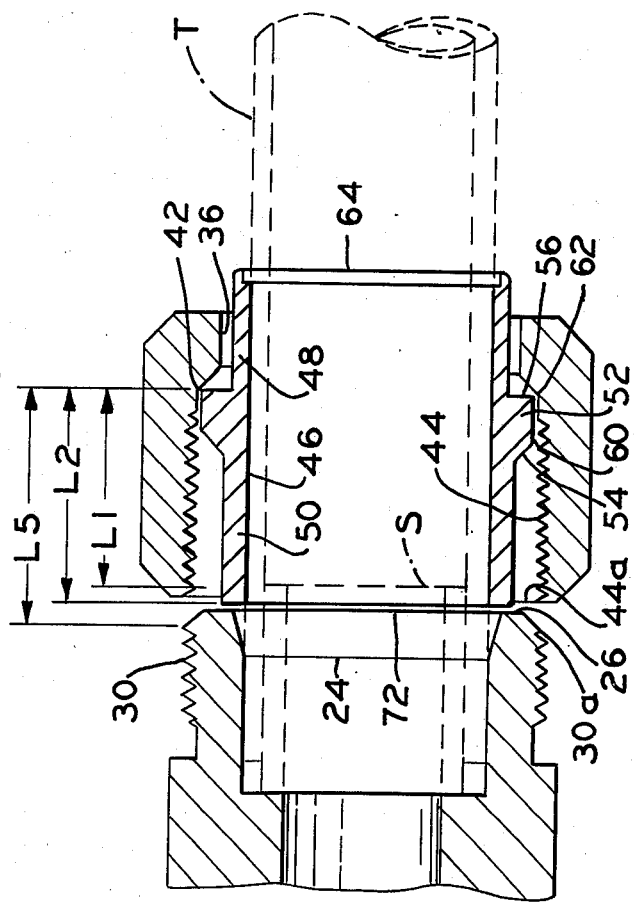
FIG. 3
FIG. 4

CONDUIT COUPLING STRUCTURE

This invention relates to the art of tube coupling devices of the character including a sleeve having an end contractible about a tube and, more particularly, to an improved sleeve structure for such a coupling device.

A wide variety of tube coupling devices have been provided heretofore which include a sleeve member having a contractible end which, upon assembly of the coupling components, is cammed radially inwardly about the tube. Such a coupling assembly generally includes a body member having a tube receiving bore and an annular cam wall extending radially and axially outwardly from the bore to receive the contractible end of the sleeve. The sleeve is provided at the end thereof opposite the contractible end with a radially outwardly projecting force receiving flange which is engaged by a radially inwardly directed flange on a coupling nut. The nut may, for example, be internally threaded for interengagement with an external thread on the body member surrounding the tube receiving bore. The contractible end of the sleeve is adapted to engage the annular cam wall of the body member, and when the nut is screwed onto the body member the sleeve is axially displaced for the contractible end to be cammed radially inwardly about the tube. This seals the juncture between the tube and coupling body against leakage of gas or liquid flowing therethrough.

In connection with coupling devices of the foregoing character, it is possible to reverse the sleeve position on the tube and achieve assembly of the coupling components. Such reversal, of course, positions the force receiving flange on the sleeve against the coupling body and, accordingly, when the nut is screwed onto the body there is little or no constriction of the sleeve end around the tube, and the desired sealing resulting from such constriction is not achieved. While such a sleeve reversal will eventually be detected as a result of leakage, the assembly and reassembly of the coupling components to achieve the proper relationship therebetween is an undesirable and time consuming maintenance procedure. Moreover, the coupling components are produced with a considerable degree of dimensional accuracy and surface smoothness to achieve proper interengagement therebetween, and such an improper assembly can damage the sleeve or coupling body to the extent that replacement thereof is required. This, of course, is both time consuming and expensive in view of material wastage.

The sleeve member in a coupling assembly of the foregoing character is a relatively expensive item due to the type of material used and the accuracy required with regard to machining the sleeve blank within relatively narrow dimensional tolerances. The cost attributable to machining is further compounded in certain sleeve structures wherein the end edge of the contractible end portion of the sleeve is provided with a special contour to achieve a desired interengaging relationship thereof with the tube about which the end portion is contracted.

Accordingly, it becomes extremely desirable to avoid assembly of the coupling components with the sleeve member in a reversed orientation from that desired, thus to minimize the problems in connection therewith including the time and cost of replacement or maintenance operations and material wastage. At the same time, it is desirable to achieve a non-reversible sleeve relationship with minimum increase in sleeve costs as a result of material used and machining requirements necessary to produce a non-reversible sleeve structure. These desirable end results are achieved in accordance with the present invention.

More particularly, an improved sleeve structure is provided in accordance with the present invention which positively prevents coupling interengagement of the coupling members when the sleeve is disposed on the tube in a reverse orientation with respect to that designed to achieve the desired constriction of the contractible end of the sleeve about the tube. The positive prevention of coupling member interengagement advantageously precludes any manual forcing of the components into an interengaged relationship by which assembly could be accomplished.

More particularly, the sleeve in accordance with the present invention is an annular member having thin wall tubular end portions and a radially outwardly projecting force receiving element therebetween. One of the end portions defines the contractible end and is adapted to engage a tapered annular cam surface in a tube receiving bore provided in one of the coupling members. Accordingly, upon movement of the contractible end against the cam surface during assembly of the coupling components, the contractible end is cammed radially inwardly about the tube. The annular cam surface has an axially outer end edge of given diameter, and the coupling member having the tube receiving bore therein includes a radial abutment surface at or axially outwardly of the end edge of the cam surface and facing outwardly of the bore. Preferably, the abutment surface intersects the cam surface at the outer end edge of the cam surface, whereby the abutment surface has an annular inner edge equal in diameter to the diameter of the outer edge of the cam surface.

The second end portion of the sleeve terminates in an end face having a diameter greater than the diameter of the inner edge of the radial abutment surface. Accordingly, sleeve reversal results in the end face of the sleeve abutting against the radial surface. Since the diameter of the inner edge of the abutment surface is less than the diameter of the end face of the sleeve, the resulting abutting relationship prevents the second end of the sleeve from engaging the cam surface and precludes the possibility of manually forcing the second end of the sleeve into constricted relationship with the tube. In addition to the foregoing diameter relationship between the inner edge of the radial abutment surface and the end face of the sleeve, the second end of the sleeve has a predetermined axial length relative to the force receiving element on the sleeve. This predetermined length axially spaces the two coupling members against interengagement therebetween when the second end of the sleeve faces the tube receiving bore. Thus, when the sleeve is reversed, interengagement of the coupling members is positively prevented by such spacing, and abutment of the second end of the sleeve against the radial abutment surface prevents the sleeve from being axially forced in the direction of the cam surface to achieve any interengagement between the coupling members.

In accordance with a preferred embodiment, the two coupling members are threadedly interengageable and the foregoing diameter and length characteristics of the second end of the sleeve provide for the threads of the two members to be axially spaced against threaded interengagement in the event of sleeve reversal. More particularly, the coupling member having the tube receiving bore therein is provided with an external thread surrounding the bore and having an axially outer entrance end, and the second coupling member is a nut provided with an internal thread having an entrance end facing the external thread when the coupling members are positioned for interengagement. Further, the nut has a radially inwardly projecting flange adapted to engage axially opposite sides of an annular force receiving flange on the sleeve. When the sleeve is improperly oriented on the tube, the end face on the second end of the sleeve engages the radial abutment surface on the bored coupling member and engagement of the nut flange with the force receiving flange on the sleeve axially spaces the entrance ends of the threads to prevent interengagement therebetween.

It is accordingly an outstanding object of the present invention to provide an improved sleeve structure for a tube coupling device including a sleeve having an end contractible about the tube upon assembly of the coupling components and which improved structure positively prevents assembly of the components with the sleeve reversely oriented on the tube.

Another object is the provision of an improved sleeve structure of a coupling device of the foregoing character by which the interengageable coupling components are axially spaced against coupling interengagement when the sleeve is reversely oriented on the tube.

A further object is the provision of an improved sleeve structure for a coupling device of the foregoing character in which the sleeve is provided with a second end axially opposite the contractible end and which second end has a diameter preventing interengagement thereof with a cam surface on one of the coupling members by which the contractible end is contracted about the tube, and which second end has a length relative to a force receiving element on the sleeve to axially space the coupling members against interengagement when the second end faces the cam surface.

Yet another object is the provision of an improved sleeve structure for a coupling device of the foregoing character, which improved sleeve is structurally simple and requires minimum accuracy with regard to machining the second end of the sleeve, whereby the sleeve is economical to produce for the intended purpose.

The foregoing objects, and others, will in part be obvious and in part pointed out more fully hereinafter in connection with the written description of a preferred embodiment of the invention shown in the accompanying drawings in which:

FIG. 1 is an exploded sectional view of the components of a coupling device including a sleeve made in accordance with the present invention and properly oriented for assembly of the device;

FIG. 2 is a sectional view showing the components of the device of FIG. 1 in partially assembled relationship;

FIG. 3 is an exploded sectional view of the components of the device shown in FIG. 1 and in which the sleeve is improperly oriented for assembly of the components; and FIG. 4 is a sectional view showing the relationship between the components of the device illustrated in FIG. 3 upon an attempt to assemble the components.

Referring now in greater detail to the drawings wherein the showings are for the purpose of illustrating a preferred embodiment of the invention only and not for the purpose of limiting the invention, the components of the coupling device shown include a body member 10, a coupling nut 12 and a sleeve 14. Coupling body 10 includes a cylindrical bore opening thereinto and having an annular wall 16 and a cam wall 18. The inner end of the bore is defined by a shoulder 20, and a passage 22 extends axially inwardly of body 10 from shoulder 20. Annular wall 16 has an axial outer end 24 which corresponds with the inner end of cam wall 18. Cam wall 18 extends axially and radially outwardly from end 24 at an angle of about 15° relative to the axis of annular wall 16, and the axial outer end of cam wall 18 intersects outer face 26 of body 10 to define an annular outer cam wall edge 28. Outer surface 26 of body member 10 extends radially of the axis of annular wall 16 and defines an abutment surface for the purpose set forth hereinafter. Body member 10 is provided with external threads 30 coaxial with annular wall 16 and including an axial outer endmost thread 30a. Outermost thread 30a has a circumferential end 30b which defines an entrance end for the external threads on the body.

Coupling nut 12 includes an annular wall 32 provided at one end with a radially inwardly extending force applying flange 34 having an annular opening 36 extending axially therethrough. Flange 34 includes an annular cam shoulder or surface 40 which intersects the annular inner surface of wall 32 along an edge 42. The inner surface of wall 32 is provided with threads 44 including an axial outermost thread 44a. Outermost thread 44a has a circumferential end 44b defining the entrance end for threads. It will be appreciated that the entrance ends of the threads on body 10 and nut 12 are adapted to interengage upon relative rotation between the body end nut to achieve threaded engagement of the nut and body.

Sleeve 14 includes a cylindrical bore 46 extending axially therethrough and by which the sleeve is adapted to receive a tube to be coupled. The sleeve has a contractible annular end portion 48, a second annular end portion 50, and an annular force receiving flange 52 between end portions 48 and 50. Flange 52 is provided with a tapered cam surface 54 facing end portion 50 and a radial wall 56 axially spaced from cam surface 54 and facing contractible end portion 48. Flange 52 further has a peripheral outer surface 58 which intersects cam surface 54 along a peripheral edge 60 and intersects radial wall 56 along a peripheral edge 62.

Contractible end portion 48 of sleeve 14 terminates in an end wall 64 having a circumferential outer edge 66 adapted to engage cam wall 18 of body member 10 as set forth more fully hereinafter. In the embodiment shown, contractible end portion 48 further includes a circumferential inner edge adapted upon constriction of end 48 to radially deform the tube being coupled. The circumferential inner edge is defined by an annular recess having an axially extending circumferential wall 68 intersecting end wall 64, and a radially inwardly extending wall 70 intersecting the inner surface of the sleeve as defined by bore 46 therethrough. Circumferential outer edge 66 preferably is a rounded edge providing a cam surface for engagement with cam wall 18 of the body portion. Further, contractible end portion 48 is of substantially uniform radial thickness along the length thereof from radial wall 56 of flange 52. Second end portion 50 has a radially extending annular end face 72 perpendicular to the axis of the sleeve, and end portion 50 is of substantially uniform radial thickness along the length thereof from cam surface 54 of flange 52.

As seen in FIG. 1, the annular outer surface of contractible end portion 48 of sleeve 14 has a diameter D1, and the annular outer edge 28 of cam wall 18 of body member 10 has a diameter D2. Further, the annular outer surface of second end portion 50 of sleeve 14 has a diameter D3. When the coupling components and sleeve are properly assembled as described hereinafter, cam shoulder 40 of nut 12 facially engages cam surface 54 of sleeve flange 52. For purposes of the ensuing description, shoulder 40 and cam surface 54 are considered to have circumferential lines of effective engagement defined respectively by edge 42 of nut 12 and edge 60 of sleeve flange 52. Further, end 44b of endmost thread 44a of nut 12 defines the effective point for engagement with end 30b of the endmost thread 30a of body member 10. The axial dimension between effective edge 42 of nut 12 and the effective line of thread end 44b is designated L1 in FIG. 1. Still further, sleeve 14 has an axial dimension L2 between radial wall 56 and end face 72, and axial dimension L3 between flange edge 60 and end face 64.

With the foregoing dimensions in mind, and with reference to FIG. 2 of the drawing, when sleeve 14 is properly oriented for assembly of the coupling components contractible end portion 48 of the sleeve faces cam wall 18 of body member 10. It will be appreciated, as shown by broken lines in FIG. 2, that sleeve 14 receives a tube T to be coupled and which tube, if desired, may be provided with an internal supporting insert sleeve S. When sleeve 14 is properly oriented relative to body member 10, rounded edge 66 of contractible end portion 48 engages cam wall 18 of body member 10 so that axial displacement of sleeve 14 inwardly of tube receiving recess causes contractible end portion 48 to be cammed radially inwardly about tube T. Preferably diameter D1 is equal to or slightly less than diameter D2 to achieve the desired interengagement between the contractible end portion and cam wall 18.

Further, when sleeve 14 is properly oriented relative to body member 10, sleeve dimension L3 provides for threads 44 of nut 11 to be interengageable with threads 30 on body member 10 to achieve assembly of the coupling components, as shown in FIG. 2. More particularly, when rounded edge 66 of sleeve 14 initially engages cam wall 18, axial dimension L1 of nut 12 provides for threads 44 thereof to interengage with threads 30 of body member 10. To achieve this interengagement, it is necessary for effective edge 42 of nut 12 to be axially spaced from end 30b of body thread 30a a distance L4 which is less than nut dimension L1. This relationship provides the necessary axial overlap between the body and nut threads to enable interengagement of ends 30b and 44b of threads 30a and 44a to achieve the coupling member interconnection.

It will be appreciated at this point, with regard to the length dimensions measured from effective lines of engagement 42 and 60, that the coincidence shown between edges 42 and 60 in FIG. 2 is for purposes of simplifying the understanding of the present description, and that in practice these edges would not exactly coincide due to clearances necessary between the nut and sleeve flange. It will be appreciated too that dimension L4 need only be sufficiently less than dimension L1 to achieve initial interengagement between the entrance end 30b and 44b of endmost threads 30a and 44a when the coupling members are initially positioned for assembly. To increase the difference between dimensions L1 and L4 merely provides additional axial overlap between threads 30 and 44 prior to displacement of sleeve 14 toward body member 10 by nut 12. While sleeve length L3 between effective edge 60 of flange 52 and end face 64 of the sleeve is less than dimensions L1 and L4 in the embodiment disclosed, this relationship is not necessary. Thus, for example, if cam wall 18 were positioned axially inwardly from surface 26 in the direction toward passage 22, dimensions L3 could be greater than either of the dimensions L1 and L4. Therefore, the critical dimensional relationship is that between dimensions L1 and L4 when the sleeve is positioned with edge 66 thereof in abutting engagement with cam wall 18. This relationship, as pointed out above, enables interengagement between the entrance ends 30b and 44b of endmost threads 30a and 44a on the coupling body and nut.

Should sleeve 14 be reversed with respect to body member 10, as shown in FIG. 3 of the drawing, second end portion 50 of the sleeve then faces the body member. In accordance with the present invention, assembly of the coupling components with the sleeve thus oriented is positively precluded. In this respect, with reference to FIGS. 3 and 4, diameter D3 of second end portion 50 of sleve 14 is greater than diameter D2 defining the outermost edge of cam wall 18. Thus, when sleeve 14 receives tube T and the latter is inserted into the tube receiving bore of body member 10, radial end face 72 of sleeve portion 50 axially abuts against radial surface 26 of body member 10. This positively prevents axial displacement of sleeve end 50 relative to cam wall 18 and thus precludes the possibility of constricting end portion 50 about tube T.

The latter preclusion of constricting end portion 50 would be true even if threads 30 of body member 10 and threads 44 of nut 12 were to be interengageable. However, it is desirable in addition to preventing constriction of end 50 of the sleeve to avoid any subsequent repair or replacement which would be necessitated if the body and nut were interengaged with the sleeve reversed. Accordingly, sleeve 14 is provided with a dimension L2 as described above which serves to positively position nut 12 relative to body member 10 such that interengagement between the threads thereof is not possible. More particularly, as seen in FIG. 4, when sleeve 14 is reversed effective edge 42 of nut 12 generally coincides with edge 62 of sleeve flange 52 to axially space nut edge 42 from entrance end 30b of endmost thread 30a of body member 10 a distance L5. As described above, nut dimension L1 is the distance between effective edge 42 thereof and entrance end 44b of outermost thread 44a thereon. In order to achieve the desired axial spacing of the entrance ends of endmost threads 30a and 44 a to prevent interengagement therebetween, dimension L5 must be greater than dimension L1. Accordingly, sleeve length L2 must be such that the engagement of end face 72 thereof with radial face 26 of the body member provides the foregoing relationship between dimensions L1 and L5.

It will be appreciated that sleeve length L2 can vary relative to dimensions L1 and L5 from that shown in FIG. 4 without departing from the desired relationship between dimensions L1 and L5. Therefore, the critical relationship is that between dimensions L1 and L5 when end face 72 of sleeve 14 engages abutment surface 26 of the body member, and sleeve length L2 will always be such as to provide for the entrance end 44*b* of endmost thread 44*a* of nut 12 to be axially spaced from entrance end 30*b* of endmost thread 30*a* on body member 10 so that thread engagement is precluded to positively prevent assembly of the components with the sleeve in reverse orientation.

The specific dimensions by which the foregoing dimensional relationships between the body member, coupling nut and sleeve are obtained to enable coupling assembly with the sleeve properly oriented and to preclude coupling assembly when the sleeve is reversely oriented will of course vary in accordance with the size of the coupling components and the tube to be coupled as well as by variations of the structures of the coupling components. The following dimensions are given as an example and with respect to the components illustrated and described herein as structured to couple a tube having an outside diameter of about 0.74 inch. Body member 10 is brass, bore 22 therein is ½ inch in diameter, and annular chamber wall 16 has a diameter from 0.742 to 0.745 inch. Cam wall 18 extends at an angle of 15° with respect to the axis of chamber wall 16, and the chamber has an axial depth from the axial outer end of cam wall 18 to shoulder 20 of from 0.525 to 0.535 inch. Cam wall 18 has a diameter at the axial outer end edge thereof (D2) of from 0.818 to 0.821 inch. Nut 12 is a hexagonal brass nut measuring 1½ inch across the flats and having an overall axial length of 13/16 inch. The nut is internally threaded with a 1-1/16 – 16 UN-2B thread and is threaded inwardly a distance of 7/16 inch from the end face thereof. Cam surface 40 extends at an angle of 45° with respect to the axis of the nut, and line 42 is spaced from 0.589 to 0.594 inch from the entrance end face of the nut. Opening 36 has a diameter of from 0.870 to 0.880 inch. Sleeve 14 is brass and has an overall axial length of 31/32 inch. Contractible end 48 has a diameter (D1) of from 0.818 to 0.820 inch, and second end portion 50 has a diameter (D3) of from 0.855 to 0.860 inch. Sleeve bore 46 has a diameter of from 0.740 to 0.742 inch. Flange 52 has a diameter from 0.980 to 0.985 inch, and cam surface 54 extends at an angle of 45° with respect to the sleeve axis. The axial distance from end edge 64 to radial flange wall 56 is 11/32 inch, and the axial distance from flange wall 56 to end face 72 (L2) is ⅝ inch. The axial distance from end edge 64 to flange line 60 (L3) is from 0.380 to 0.395 inch. Outer edge 66 of contractible end portion 48 has a radius of curvature of from 0.010 to 0.015 inch.

While the invention has been described herein in its preferred form and with a certain degree of peculiarity, it will be appreciated that many embodiments of the invention can be made and that many changes can be made in the embodiment herein illustrated and described without departing from the principles of the invention. Accordingly, it is to be distinctly understood that the foregoing descriptive matter is to be interpreted merely as illustrative of the present invention and not as a limitation.

What is claimed is:

1. In a tube coupling device of the character including first and second coupling members having cooperably interengageable means for connecting the members together, an annular sleeve receiving the tube and having a contractible end portion, said first coupling member having a tube receiving bore and an annular cam wall extending radially and axially outwardly from said bore and receiving said contractible end portion of said sleeve, said sleeve including force receiving means spaced from said contractible end in the direction outwardly of said bore, and said second coupling member including means engaging said force receiving means when said first and second members are connected together forcing said contractible end portion against said cam wall and camming the contractible end portion against the tube, the improvement comprising: said sleeve having a second end portion extending in said direction from said force receiving means and having an end face spaced from said force receiving means in said direction, said cam wall having an axially outer edge having a given diameter, said first coupling member further including means defining a radial abutment surface facing in said direction and having an annular inner edge the diameter of which is at least equal to said given diameter, at least said end face of said second end portion of said sleeve having a diameter greater than said given diameter, whereby said end face abuts against said abutment surface when said sleeve is received on said tube with said second end portion facing said bore, and said sleeve having a length between said end face and said force receiving means, said length axially spacing said cooperably interengageable means on said first and second coupling members against interconnection when said end face abuts said abutment surface and said means on said second coupling member engages said force receiving means.

2. The improvement according to claim 1, wherein said first coupling member has an outer surface in said direction and said cam wall intersects said outer surface to define said outer edge of said cam wall and said inner edge of said abutment surface.

3. The improvement according to claim 1, wherein said second end portion of said sleeve is cylindrical and of uniform diameter and said end face of said second end portion is planar and perpendicular to the axis of said sleeve.

4. The improvement according to claim 1, wherein said second coupling member is a nut, said cooperably interengageable means on said first and second coupling members are threads on said nut and threads on said first member, said force receiving means is a radially outwardly projecting flange extending about said sleeve, and said means on said second coupling member is a radially inwardly projecting flange on said nut.

5. The improvement according to claim 1, wherein said first coupling member has a planar outer surface and said bore opens into said first member from said outer surface, said cam wall intersecting said outer surface to define said outer edge of said cam wall and said inner edge of said abutment surface, and said end face of said second end portion of said sleeve being planar and parallel to said outer surface of said first member.

6. The improvement according to claim 5, wherein said first member includes external thread means coaxial with said bore and said second member is a nut having internal thread means, said external and internal thread means providing said cooperably interengageable means, said force receiving means being a radially outwardly projecting flange extending about said sleeve, and said means on said second member being a flange projecting radially inwardly of said internal thread means.

7. In a tube coupling device comprising a coupling body having an end face and a tube receiving bore opening into said body therefrom, an annular cam wall having an inner end intersecting said bore, said cam wall tapering axially and radially outwardly from said inner end and intersecting said end face along an edge having a given diameter, external thread means on said body coaxial with said bore and having an entrance end adjacent said end face, an annular sleeve for receiving the tube, said sleeve including a first cylindrical wall having a contractible end received against said cam wall and a peripheral flange axially spaced from said contractible end and projecting radially outwardly from said first cylindrical wall, a coupling nut received on said tube and having an apertured peripheral wall radially engaging said flange on the side thereof axially opposite said contractible end of said first cylindrical wall, internal thread means on said nut extending axially of said peripheral wall and having an entrance end spaced from said peripheral wall in the direction toward said contractible end of said first cylindrical wall, said entrance ends of said internal and external thread means being cooperatively interengageable for rotation of said nut to connect said nut and body and for said nut wall to engage said flange and force said contractible end of said first cylindrical wall against said cam wall to cam said contractible end against the tube, the improvement comprising: said sleeve including a second cylindrical wall extending axially from said flange in the direction away from said contractible end and through said apertured peripheral wall of said nut, said second cylindrical wall having an end surface axially spaced from said flange and a diameter greater than said given diameter of said edge of said cam wall, whereby said end surface abuts against said end face of said first member when said sleeve is received on said tube with said second cylindrical wall facing said body, and said end surface of said second cylindrical wall being axially spaced from said flange such that said entrance ends of said internal and external thread means are axially spaced apart against interengagement when said peripheral nut wall engages said flange on the side thereof axially opposite said end surface of said second cylindrical wall and said end surface abuts against said end face.

* * * * *